H. I. MANLEY.
FLUID CONTROLLED CLUTCH.
APPLICATION FILED MAY 1, 1912.
1,057,251.
Patented Mar. 25, 1913.
2 SHEETS—SHEET 1.
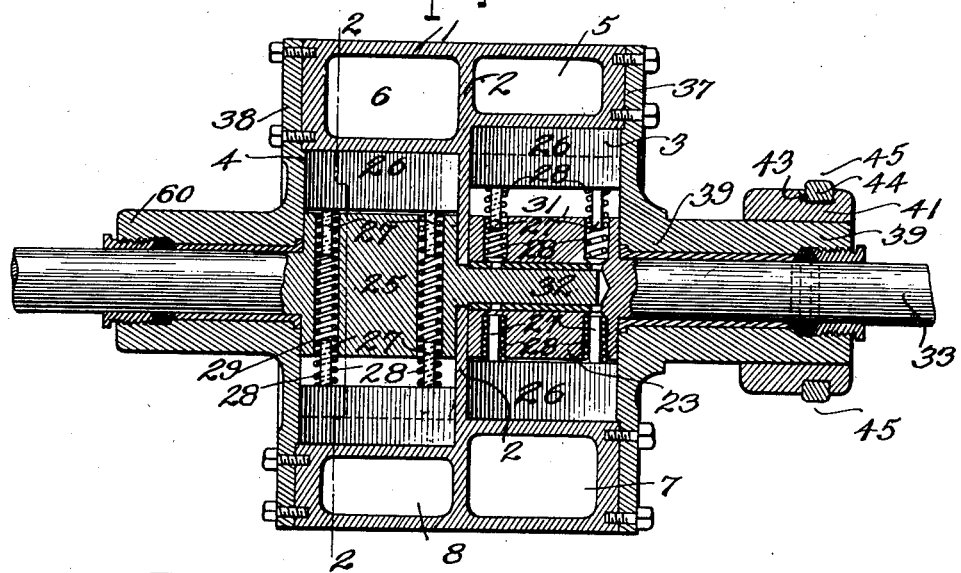
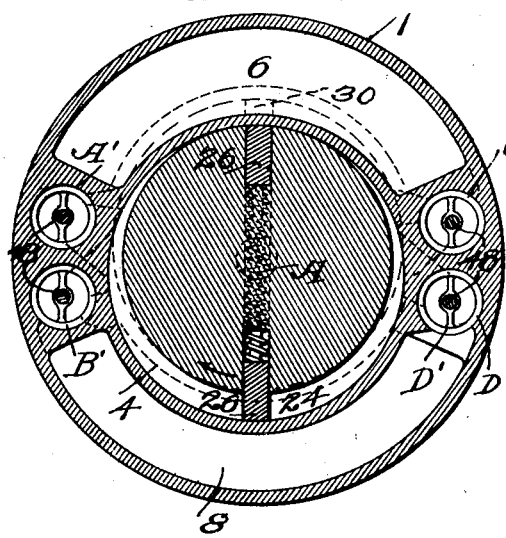
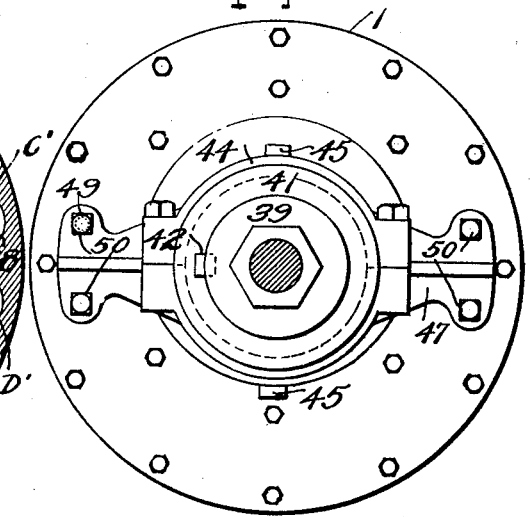
Witnesses
E. K. Wagner
Geo. W. Kirkley
Inventor
Howard I. Manley
By Beeler Robb
H. C. Robb
Attorneys H. I. MANLEY.
FLUID CONTROLLED CLUTCH.
APPLICATION FILED MAY 1, 1912.
1,057,251.
Patented Mar. 25, 1913.
2 SHEETS—SHEET 2.
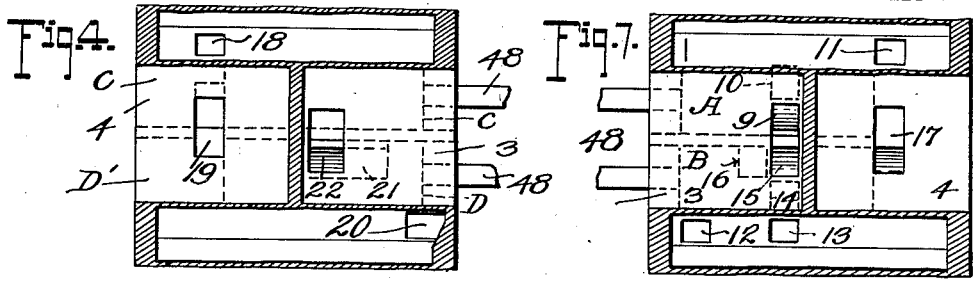
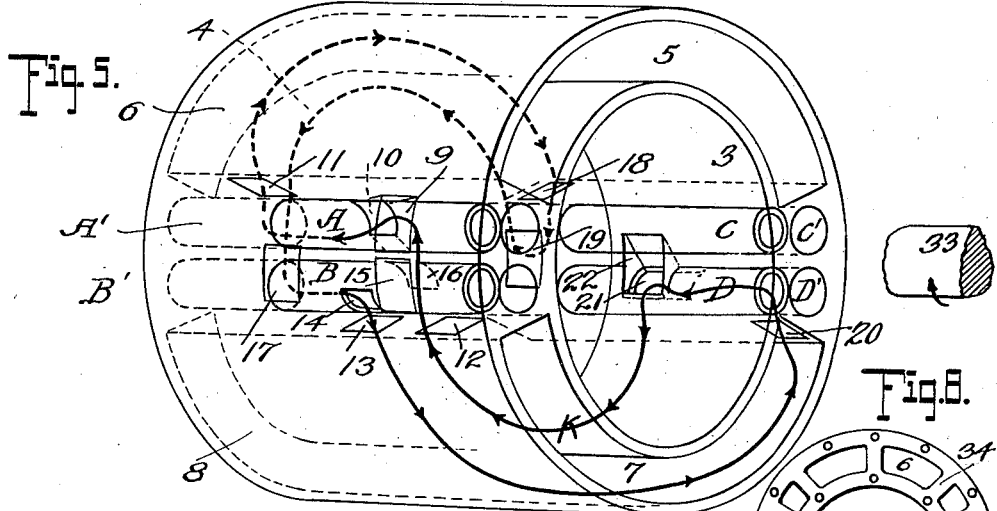
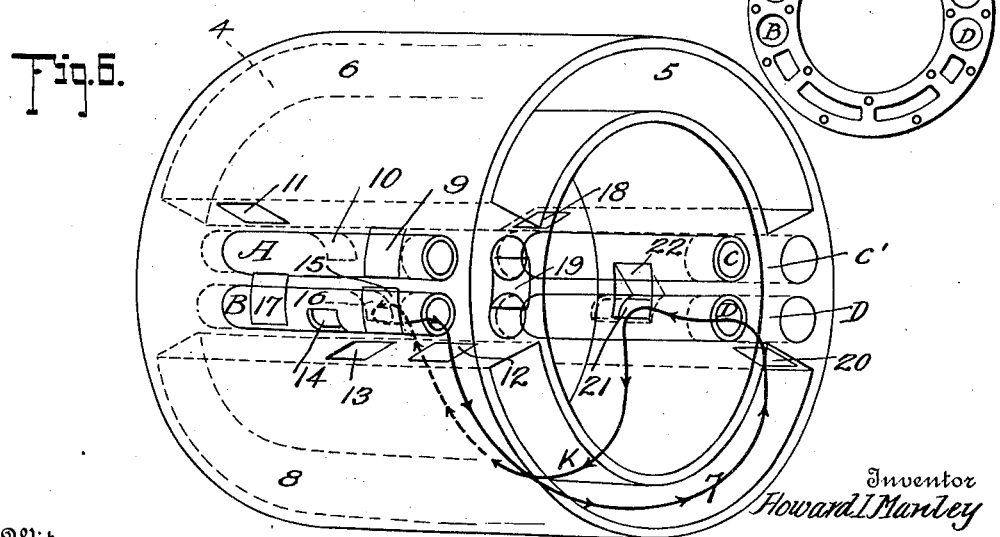
Witnesses
E. H. Wagner,
Geo. W. Kirkley
Inventor
Howard I. Manley
By Beeler Robb
    A. H. E. Robb
Attorneys

UNITED STATES PATENT OFFICE.

HOWARD I. MANLEY, OF KANSAS CITY, MISSOURI, ASSIGNOR OF ONE-HALF TO R. H. WRIGHT, OF DURHAM, NEW YORK.

FLUID-CONTROLLED CLUTCH.

1,057,251. Specification of Letters Patent. Patented Mar. 25, 1913.

Application filed May 1, 1912. Serial No. 694,484.

*To all whom it may concern:*

Be it known that I, HOWARD I. MANLEY, a citizen of the United States, residing at Kansas City, in the county of Jackson and State of Missouri, have invented certain new and useful Improvements in Fluid-Controlled Clutches, of which the following is a specification.

This invention relates to fluid controlled clutches, and has particular reference to that class of apparatus in which cylindrical casings are provided and are adapted to be filled with oil, a rotating shaft which enters the casing, either propelling the body of oil, or when the valves are placed in a certain position so that the body of oil cannot be propelled, the shaft, through the medium of a connecting body, will carry the casing with it during its rotation, so as to obtain a direct drive.

The object of the invention is to provide a device of the above character, by means of which a direct drive and a drive in a reverse direction may be obtained from a constantly rotating shaft, the device being so constructed that a change from the neutral condition to a direct drive may be brought about by shifting a set of specially constructed valves which act in connection with the port openings arranged in the casing. By a further movement of the valves the change from direct drive to reverse drive may be accomplished.

A further object of the invention is to so construct the parts of the device that the weight may be perfectly balanced during rotation, so as to avoid all possibility of vibration regardless of the speed at which the device is operated.

For a full understanding of the present invention, reference is to be had to the following description and the accompanying drawings, in which—

Figure 1 is a vertical longitudinal section through the main driving and reverse driving chambers; Fig. 2 is a transverse section through the main driving chamber and through the valve chambers, the position of the reverse chamber being shown in dotted lines; Fig. 3 is an end elevation of the device; Fig. 4 is a view looking toward the valves C and D, hereinafter described, from the interior of the driving chambers; Fig. 5 is a diagrammatic view, showing the path of the oil for reverse drive; Fig. 6 is a diagrammatic view, showing the path of the oil for neutral and direct drives, the positions of the valves in this figure being changed with reference to the positions of the same shown in Fig. 5; Fig. 7 is a view looking toward the valves A and B, hereinafter described, from the interior of the driving chambers; and Fig. 8 is an end view of the casing with the outer end plate removed, the same being shown on a reduced scale.

Throughout the following detail description and on the several figures of the drawings, similar parts are referred to by like reference characters.

Referring particularly to the drawings, the numeral 1 represents a cylindrical casing which is provided at about its central portion with a wall 2 which divides the casing into two main sections. The right-hand section, that which receives the driving shaft hereinafter referred to, is provided with a circular chamber 3 eccentrically arranged with reference to the said right-hand section. The left-hand section is likewise formed with a cylindrical chamber, 4, eccentrically arranged with reference to the left-hand section of the casing. Two diametrically opposite portions of the cylindrical casing 1 are formed solid in the space between the inner chambers 3 and 4 and the outer walls of the casing, so as to afford four valve chambers arranged in adjacent pairs and lettered A', B', C', and D' in the drawings. The valve chamber A' is opposite the valve chamber C', and B' is opposite D'. The valve chambers may be of any desired shape, provided that the valves which slide in them are of corresponding shape, but they are preferably circular in cross section, and are so illustrated in the drawings.

The valve chambers A', B', C' and D' receive four sliding valves A, B, C, and D respectively, each valve being of hollow cylindrical formation and all being formed substantially alike, except with regard to the port openings hereinafter referred to. A cored chamber 5 is formed above the valve chambers A' and C' and above the chamber 3, the latter being the main driving chamber, and a cored chamber 6 is formed in the left-hand section of the casing above the valve chambers A' and C' and above the chamber 4, which latter is the reverse driving chamber. Likewise, a cored chamber 7 is located below the valve chambers B' and D' and below the main driving chamber 3, and a cored chamber 8 is located in the left-hand section of the casing below the valve chambers B' and D' and below the reverse driving chamber 4. It will be seen that by virtue of the eccentric arrangement of the main driving chamber 3 with respect to the casing 1, the width of the lower cored chamber 7 at its lowermost point is less than the width of the cored chamber 5 at its uppermost point. The eccentric chamber 4, which is the reverse driving chamber, is symmetrically mounted with reference to the main driving chamber 3 with reference to the central axis of the casing 1, so that the width of the lower cored chamber 8 at its lowermost point is greater than the width of the upper cored chamber 6 at its uppermost point.

I will now proceed to describe the location and arrangement of the ports which are formed in the valve chambers and in the valves, so as to obtain a change of drive to and from direct, reverse, and neutral. Some of these valves connect the cored chambers formed on both the right and left-hand sections of the casing with the valve chambers, others connect the main driving chamber and the reverse driving chamber with the valve chambers, while others are formed in the valves and are adapted according to the position occupied by the valves, to co-act with the port openings formed in the valve chambers. In order to convey a more distinct understanding of the present invention, it might be here stated that when the reverse drive is desired, the four valves will occupy an extreme position to the right, as is shown in the diagrammatical Fig. 5. Referring first to the ports formed in the valve A and valve chamber A', it will be seen that a port 9 is formed in the wall of the driving chamber 3 and establishes communication between the driving chamber 3 and the valve chamber A'. A port 10 is formed in the valve A, so that when the valve A is in its position to the extreme right; that is, for reverse drive, the port 10 will be opposite the port 9, so that communication through the two ports may be established. There is no port establishing communication between the cored chamber 5 and the valve chamber A', nor is there any port connecting the reverse driving chamber 4 with the valve chamber A', but a port 11 establishes communication between the cored chamber 6 and the valve chamber A'. This port occupies the position shown in diagrammatical Fig. 5, that is, it is in a position to the left of the left end of the valve A when the latter is in its position to the extreme right for reverse drive, so that communication may be established through the port 11 and into and through the valve A.

The valve chamber B' communicates with the lower cored chamber 7 by means of two ports 12 and 13, the former being covered by the valve B when the latter is in its position to the extreme right for reverse drive, as will be seen upon reference to diagrammatical Fig. 5, but will be uncovered when the valve B is shifted to the left, so that communication between the cored chamber 7 and the interior of valve B may be established. A port 14 is formed in the valve B, which will normally register with the port 13 when the valve B is in its extreme position to the right. A port 15 is formed in the wall of the main driving chamber and is adapted to register with the port 16 formed in valve B when B is moved to the left for the neutral drive. A port 17 connects the valve chamber B' with the reverse driving chamber 4, and is normally uncovered by the valve B when the latter is in its position to the extreme right but will be covered by the valve B when it is moved to the left for the neutral drive.

Referring now to the valves C and D and the ports which establish communication therebetween and the driving chambers and cored chambers, it will be seen that the valve C is not provided with any ports, since at no time during the operation of the device is it necessary for the valve C to afford a passage for the oil during its circulation. The valve C serves a purpose merely in closing the port openings arranged to the left of the valve, when the neutral drive is desired. These two ports consist of one numbered 18 by which communication is established between the valve chamber C' and the cored chamber 6 which is situated above the reverse driving chamber 4. The other port numbered 19 establishes communication between the valve chambers C' and the reverse driving chamber. The ports 18 and 19 will be uncovered when the valve C is in its position at the extreme right for the reverse drive, but will be covered by moving the valve C to the left, their specific purpose being to change the direction of travel of the oil during its circulation and cause the oil to act on the blades of the driving head, hereinafter referred to, disposed within the chamber 4, thereby driving the said head in a direction contrary to that of the main driving shaft. The valve chamber D' communicates with the cored chamber 7 formed beneath the main driving chamber, by means of the port 20, which is formed to the extreme right of the valve chamber and will permit passage of oil into the valve D from the cored chamber at all times, since it is normally uncovered by the valve D even when the latter is in its extreme position to the right. A port 21 is formed in the valve D, which, when the latter is in its position to the extreme right, will register with a port 22 formed in the wall of the driving chamber, the port 21 being formed of such a length that it will register with the port 22, not only when the valve D is in its position to the right, but also when it is shifted to the left for the neutral drive. There are no ports establishing communication between the valve chamber D' and the cored chambers 6 and 8 situated respectively above and below the reverse driving chamber 4. From the relative dispositions and locations of the ports formed in the four valves, and which establish communication between the valves and the driving and reverse driving chambers and also with the cored chambers formed adjacent to the reverse driving chamber, it will be seen that all of said ports will be covered when the valves are moved still farther to the left than the positions which they occupy for the neutral drive, as will be clear upon reference to diagrammatical Fig. 6.

The structure and disposition of the driving heads which are disposed in the main driving and reverse driving chambers will now be described.

A cylindrical disk 23 forms the main driving head arranged in the main driving chamber 3, and is formed of a diameter somewhat less than the diameter of the main driving chamber 3. The axis of the driving head 23 corresponds to the central axis of the cylindrical casing 1, but is eccentrically located with reference to the axis of the main driving chamber 3, the latter being below the axis of the driving head 23, as will be seen upon reference to Fig. 2. By this means a space 24 is formed between the driving head 23 and the wall of the cored chamber 7 and the walls of the valve chambers, this space, of course, always remaining of uniform volume during the rotation of the driving head 23. It should be stated here that the axis of the right-hand, or main drive, chamber is disposed below the central axis of the cylindrical casing 1, and the axis of the left-hand, or reverse, drive chamber is disposed an equal distance above the central axis of the casing 1. The axis of the reverse driving head 25, which is disposed within the reverse driving chamber 4, also corresponds to the central axis of the cylindrical casing 1, as in the case of the driving head 23. The two heads 23 and 25 are, therefore, concentrically mounted with reference to the casing 1 and both are in alinement. The two driving heads are each similarly formed with a pair of diametrically opposite blades 26 which have stems 27 extending toward the axes of the driving heads and by means of which the movement of the blades is guided, and springs 28 are arranged in the sockets 29 formed in the driving heads, by means of which the blades are normally pressed radially outwardly, so that during the rotation of the driving heads, the outer ends of the blades 26 will always be maintained in close contact with the walls of the respective driving chambers. As will be seen upon reference to Fig. 2, each blade during the rotation of the driving head will be pressed inwardly so that its outer end will lie flush with the periphery of the driving head when the blade travels past the space formed between the driving head and the adjacent wall of the driving chamber. In a similar manner to the formation of the space 24, a space 30 will be formed between the reverse driving head 25 and the upper cored chamber 6 located above the reverse chamber, and also between the head 25 and the walls of the valve chambers, this space being disposed opposite to the space 24 with respect to the axis of the casing, and symmetrical therewith.

A bushing 31 is formed in the main driving head 23, which affords a bearing for a spindle 32, which latter is integrally formed with the driving head 25 and which passes through an opening 32 formed in the central wall 2. The driving heads 23 and 25 will thus rotate independently of each other, or the head 23 may rotate while the head 25 is stationary, as will be the case at the time of neutral drive.

The main driving head 23 is normally rotated by means of the drive shaft 33, which latter will be constantly rotated in the direction of the arrow. The outer side 34 of the cylindrical casing 1 is open in its central portion, such portion being occupied by the chamber 3, and in the space between the said aperture and the outer periphery of the casing, four circular openings 35 are formed, these being arranged in diametrically opposite pairs, and are co-terminal with the four valve chambers hereinbefore referred to. The spaces between the said openings 35 are provided with a plurality of apertures 36, which decrease in width from the upper end of the casing, that is, the portion adjacent the cored chamber 5, to the lower part of the casing, that adjacent the cored chamber 7. The purpose of this formation of the end of the casing is to afford the requisite lightness for the entire structure, as it is necessary during the direct drive that the entire structure be rotated with the shaft 33. The opposite end of the casing is formed in a manner similar to the end just described, it being provided with the openings 35 and 36, but the disposition of the corresponding sized openings in this end of the casing is at an angle of 180 degrees to the openings formed in the end 34. By this construction of the end faces of the casing 1, as well as by the disposition of the eccentric chambers 3 and 4, before referred to, a perfect balancing of the entire structure may be realized, thus insuring the rotation of the entire structure without any vibration, as the weight will be symmetrically distributed with reference to the central axis of the casing 1. The plates 37 and 38 are mounted on the opposite ends of the casing 1, and the former is provided with the hub 39 having a bushing 40 for the reception of the driving shaft 33. A collar 41 is slidably mounted on the hub 39, the key 42, formed in the hub, permitting of such sliding movement and causing the rotation of the collar 41 with the hub at the time of direct drive, the manner in which the same is accomplished being hereinafter described. A channel 43 is formed in the sliding collar 41, said channel being adapted to receive a clutch collar 44 having connection with a suitable shifting lever (not shown) by means of the socket 45. The collar 41 is provided with a pair of diametrically opposite arms 46 and 47, which are adapted to receive the ends of valve rods 48 through the openings 49, two of the openings being formed in each of said arms near the outer end thereof and the valve rods 48 having their extreme outer ends threaded for the reception of nuts 50, by which the rods are fastened to the arms 46 and 47. By the means described the collar 41 may be moved to the right or left on the hub 39, thus shifting the valves A, B, C, and D to the desired positions, and while the drive shaft 33 is capable of rotation within the casing 1 and hub 39 for the reverse and neutral drives, the structure described will permit of the bodily rotation of the casing 1, hub 39, collar 41, arms 46 and 47, and valve rods 48 with the driving shaft 33. The ring, or clutch collar 44 will, of course, alone remain stationary while all of the parts rotate at the time of direct drive.

The cored chambers 5, 6, 7, and 8, the valves A, B, C, and D, and portions of the valve chambers A', B', C', and D' not occupied by the respective valves, and the spaces in the main and reverse driving chambers not occupied by the driving heads, will be filled with oil, the same being introduced in any desired manner, but preferably through the openings 35 and 36, after which the outer right-hand plate of the casing will be mounted in position and fastened to the casing. Referring to the diagrammatic Fig. 5, it will be seen that the valves are all in a position to the extreme right, and are in a position uncovering the ports which connect the valves and valve chambers with the four cored chambers and the main and reverse driving chambers. With the main driving head 23 rotating in the direction of the arrow, the blades of the driving head will force the oil into the reverse driving chamber, where the oil will impinge upon the blades formed upon the reverse driving head to rotate the said head in the direction opposite to the direction of rotation of the main driving head 23. While this reversing action takes place, the body of the apparatus remains stationary with respect to both the driving and reverse driving heads and shafts. The circulation of the oil in order to bring about this result will be as follows, it being here stated that the path of the oil through the main driving chamber and the cored passages above and below the same is represented by full lines, while the passage of the oil through the reverse driving chamber and in the cored passage above the same is represented by dotted lines: starting at the point K in the space 24 in the main driving chamber, the oil will be forced by the blades 26 in the direction of the arrow through the port 9 which connects the main driving chamber 3 with the valve chamber A', through the port 10 in valve A, longitudinally through valve A, out of valve chamber A' through the port 11 into the cored chamber 6 above the reverse driving chamber, traveling the entire length of the same, passing through port 18 into the valve chamber C', out of said valve chamber through port 19 into the reverse driving chamber, and as the space in the latter not occupied by the reverse driving head 25 is in the upper part of the chamber, the path of the oil will be reversed and directed upwardly. In this space in the reverse driving chamber, the oil impinges upon the blades formed on the driving head 25 and rotates the same in a direction contrary to that of the head 23. After traveling through the reverse driving chamber 4, the oil passes through the port 17 which opens into the valve chamber B', enters valve B, passes through port 14 of valve B, through port 13 into the lower cored chamber 7 beneath the main driving chamber 3. The oil travels the entire length of this chamber, then up through port 20 into the valve chamber D', travels lengthwise through valve D, through port 21 in same, and out through port 22 into the space 24 of the main driving chamber, and back to point K.

For the neutral drive the valves are shifted to the left to the positions shown in Fig. 6, the valve C covering the ports 18 and 19, the valve A covering the ports 9 and 11, the valve B covering the port 17, and the port 12 being uncovered. By this means no circulation of oil can be obtained from the driving chamber into the reverse driving chamber, but a circulation will be set up as follows, the path of the oil being shown in full lines: starting at point K in space 24 of the main driving chamber 3, the oil passes through the port 15 into the valve chamber B', through port 16 into the valve B, out of valve B through port 12 into the lower cored chamber 7, traveling the entire length of the latter, then through the port 20 into valve chamber D', through valve D, through port 21 in valve D, through port 22 and out into the main driving chamber, and back to point K. During this travel of the oil, both the body of the apparatus and the reverse driving head and reverse driving shaft are stationary, allowing the driving shaft and the main driving head 23 to rotate freely.

In order to obtain direct drive, the valves are shifted still further to the left, that is, to the dotted line positions of the same shown in Fig. 6, by which all of the parts which establish communication between the valve chambers and the main and reverse driving chambers will be closed. As there are no ports which permit of communication between the driving chambers and the cored chambers directly, the oil will be trapped in the spaces between the driving head and the walls of the driving chambers. As the oil on either side of that one of the blades 26 which lies in the space 24, cannot pass to the other side of the blade a pressure is created within the space 24 which causes the blade 26 to engage the wall of the driving chamber 3, so that the same will be rotated with the main driving head and driving shaft. By this means the entire structure will be caused to rotate with the drive shaft, and by means of the hub 60, suitable connections may be established by which a direct drive may be obtained in the same direction as the direction of the shaft 33.

Having thus described the invention, what is claimed as new is:

1. In combination with a rotary driving element, a casing comprising a plurality of chambers in one of which said driving element rotates, said chambers containing a fluid pressure medium, a rotary driven element disposed within another one of said chambers, the chambers inclosing the driving and driven elements being cylindrical and eccentric to the journals of the driving and driven elements, one at one side of the axis thereof, and the other at the opposite side and valves controlling the circulation of the said fluid pressure medium through said chambers, the arrangement of said driven element in its confining chamber being such with reference to the arrangement of said driving element in its confining chamber that the general direction of the fluid medium will be reversed in the chamber confining said rotary driven element at one position of the valves, so as to rotate the said driven element in a reverse direction to that of said driving element, the valves being shiftable to a position interrupting the circulation of the pressure medium for transmitting power directly from the driving element through the casing and inclosed parts to the driven element.

2. In combination with a rotary driving element, a casing comprising a plurality of chambers in one of which said driving element rotates, said chambers containing a fluid pressure medium, a rotary driven element disposed within another one of said chambers, valves controlling the circulation of the said fluid pressure medium through said chambers, means for shifting said valves, and connecting means between said valve shifting means and said rotary driving element, the arrangement of said driven element in its confining chamber being such with reference to the arrangement of said driving element in its confining chamber that the general direction of the fluid medium will be reversed in the chamber confining said rotary driven element at one position of the valves, so as to rotate the said driven element in a reverse direction to that of said driving element, the valves at another position being adapted to shut off communication with the chamber confining said rotary driving element, whereby the entire casing will be caused to rotate with said rotary driving element so as to obtain direct drive.

3. In combination with a rotary driving element, a casing comprising a main driving chamber and a reverse driving chamber, said rotary driving element being arranged within said main driving casing, a rotary driven element disposed within said reverse driving chamber, passages connecting said two chambers, valves controlling said passages, said chambers and said passages containing a fluid pressure medium, the arrangement of said driven element in said reverse driving chamber being such with reference to the arrangement of said driving element in said main driving chamber that the general direction of the fluid medium will be reversed in said reverse driving chamber at one position of the valves, so as to rotate the said driven element in a reverse direction to that of said driving element, said valves at another position being adapted to shut off communication between said two chambers, whereby the said rotary driving element may freely rotate within said driving chamber while said driven element is stationary, and the valves at still another position thereof being adapted to shut off all communication with said main driving chamber, whereby the entire casing will be caused to rotate with said rotary driving element so as to obtain direct drive.

4. In combination with a rotary driving element, a casing comprising a main driving chamber and a reverse driving chamber, said rotary driving element being disposed within said main driving chamber, a rotary driven element disposed within said reverse driving chamber, a pair of chambers arranged adjacent each of said driving chambers, valve chambers arranged between the said last named chambers of each pair, passages connecting said main and reverse driving chambers with said valve chambers, passages connecting said valve chambers with said pairs of chambers, valves movable within said valve chambers to control the passage of fluid through said passages, means for simultaneously shifting said valves, and connecting means between said valve shifting means and said rotary driving element, the arrangement of said driven element in said reverse driving chamber being such with reference to the arrangement of said driving element in said main driving chamber that the general direction of the fluid medium will be reversed in said reverse driving chamber at one position of the valves, so as to rotate the said driven element in a reverse direction to that of said driving element, said valves at another position thereof being adapted to close the passages by which communication between said main and reverse driving chambers is established, whereby the said rotary driving element may rotate freely in said main driving chamber while said driven element is stationary, and said valves at still another position thereof being adapted to shut off all communication with the main driving chamber, whereby the entire casing will be caused to rotate with the rotary driving element to obtain direct drive.

5. In combination with a driving shaft, a driving head mounted thereon, said head being provided with means to propel a fluid, a casing comprising a main driving chamber in which said driving head rotates and a reverse driving chamber, a reverse driving head arranged within said reverse chamber, the axes of said two driving heads corresponding to the central axis of said casing and said chambers being eccentrically mounted with reference to said central axis, the axes of said chambers being opposite to said central axis, whereby a space is established between said main driving head and the walls of its confining chamber diametrically opposite to a space established between said reverse driving head and the walls of its confining chamber, passages affording communication between said two chambers, said chambers and said passages containing a fluid pressure medium, and valves controlling the circulation of the fluid pressure medium through said chambers and said passages, the arrangement of said reverse driving head in said reverse driving chamber being such, with reference to the arrangement of said main driving head in the main driving chamber that the general direction of the fluid medium will be reversed in said reversing chamber at one position of the valves, so as to rotate the said reverse driving head in a reverse direction to that of said main driving head.

6. In combination with a driving shaft, a driving head mounted thereon, said head being provided with means to propel a fluid, a casing comprising a main driving chamber in which said driving head rotates, and a reverse driving chamber, a reverse driving head arranged within said reverse chamber, the axes of said two driving heads corresponding to the central axis of said casing and said chambers being eccentrically mounted with reference to said central axis, the axes of said chambers being opposite to said central axis, whereby a space is established between said main driving head and the walls of its confining chamber diametrically opposite to a space established between said reverse driving head and the walls of its confining chamber, a pair of valve chambers arranged on each side of said two chambers, valves movable in said valve chambers, means for simultaneously shifting said valves, a cored chamber disposed above and below each of said driving chambers and between said pairs of valve chambers, ports arranged in said valve chambers establishing communication therebetween and said cored chambers, ports establishing communication between said driving chambers and said valve chambers, and ports in said valves adapted to register with said last named ports, the arrangement being such that at one position of the valves the circulation of the fluid pressure medium is established between said main and reverse driving chambers, whereby said reverse driving head may be acted upon by the fluid medium to propel the said head in a reverse direction to that of said main driving head, the valves at another position thereof being adapted to close the ports which establish communication between the main and reverse driving chambers, whereby the main driving head may rotate freely in the main driving chamber, and the valves at still another position thereof being adapted to close all ports communicating with the main driving chamber, whereby the confined body of fluid in the main driving chamber will cause the entire casing to rotate with the main driving head for direct drive.

7. In combination with a rotary driving shaft, a driving head mounted on said shaft, a casing comprising a main driving chamber and a reverse driving chamber divided by a centrally disposed wall, said main driving head being rotatable in the main driving chamber, a reverse driving head disposed within said reverse driving chamber and rotatable therein, blades carried by each of said heads, means tending to press said blades normally outwardly, a pair of chambers arranged adjacent each of said driving chambers, valve chambers arranged between the chambers of each pair, valves slidable in said valve chambers, ports establishing communication between the driving chambers and the valve chambers, ports establishing communication between the valve chambers and said pairs of chambers, rods connected with said valves, a hub for said casing in which said driving shaft rotates, a collar slidable on said hub, and arms mounted on said collar to which said valve rods are attached.

8. In combination with a rotary driving shaft, a casing comprising a main driving chamber and a reverse driving chamber, each being oppositely eccentrically mounted with reference to the central axis of the casing, a main driving head mounted on said driving shaft eccentrically mounted in said main driving chamber and rotatable therein, blades carried by said main driving head, means to press said blades normally outwardly, a reverse driving head eccentrically mounted in said reverse driving chamber, blades mounted on said reverse driving head and means to press the same normally outwardly, a pair of valve chambers arranged longitudinally of the casing, a second pair of valve chambers opposite the first named, also arranged longitudinally of the casing, a cored chamber disposed above said main driving chamber, a second cored chamber disposed below the same, a third cored chamber disposed above the reverse driving chamber, a fourth cored chamber disposed below the same, all of said chambers and said valve chambers containing a fluid pressure medium, valves slidable in said valve chambers, ports connecting said main and reverse driving chambers with said valve chambers, ports connecting said valve chambers with said third cored chamber whereby the fluid pressure medium may circulate from the main driving chamber to the reverse driving chamber in one position of the valves to enable the fluid to act on said reverse driving head so as to rotate the same in a direction reverse to that of the driving shaft, said ports being closed at another position of the valves, whereby communication between the two driving chambers is closed and said main driving head will rotate freely within the main driving chamber while the reverse driving head is stationary, and ports connecting said valve chambers with the said second cored chamber, whereby circulation of the fluid may be established between the main driving chamber and said cored chamber while the communication between the two driving chambers is shut off.

In testimony whereof I affix my signature in presence of two witnesses.

HOWARD I. MANLEY.

Witnesses:
    HATTIE S. FRANCK,
    HAL R. LEBRECHT.